United States Patent [19]
Matsen et al.

[11] Patent Number: 5,624,594
[45] Date of Patent: Apr. 29, 1997

[54] FIXED COIL INDUCTION HEATER FOR THERMOPLASTIC WELDING

[75] Inventors: Marc R. Matsen, Seattle; John A. Mittleider, Kent; Karl A. Hansen, deceased, late of Seattle; by John J. deJong, executor, Bellevue, all of Wash.

[73] Assignee: The Boeing Company, Seattle, Wash.

[21] Appl. No.: 469,134

[22] Filed: Jun. 6, 1995

Related U.S. Application Data

[63] Continuation-in-part of Ser. No. 341,779, Nov. 18, 1994, which is a continuation-in-part of Ser. No. 151,433, Nov. 12, 1993, Pat. No. 5,420,400, Ser. No. 169,655, Dec. 16, 1993, Pat. No. 5,530,227, and Ser. No. 92,050, Jul. 15, 1993, Pat. No. 5,410,133, which is a division of Ser. No. 681,004, Apr. 5, 1991, Pat. No. 5,229,562, said Ser. No. 169,655, Dec. 16, 1993, is a continuation-in-part of Ser. No. 777,739, Oct. 15, 1991, Pat. No. 5,410,132.

[51] Int. Cl.⁶ .................................................... H05B 6/40
[52] U.S. Cl. ...................... 219/633; 219/645; 219/647
[58] Field of Search .................................. 219/600–615, 219/633–634, 670, 676, 656, 645; 156/274.2, 380.2

[56] References Cited

U.S. PATENT DOCUMENTS

| | | |
|---|---|---|
| 2,241,312 | 5/1941 | Luty . |
| 2,273,423 | 2/1942 | Somes . |
| 2,273,609 | 2/1942 | Wrighton et al. ................. 219/633 |
| 2,372,920 | 4/1945 | Blessing . |
| 2,378,801 | 6/1945 | Sidell et al. . |
| 2,379,829 | 3/1945 | Pedlow et al. . |
| 2,423,922 | 7/1947 | Arnt, Jr. . |
| 2,589,777 | 3/1952 | Collins . |
| 2,761,941 | 9/1956 | Ardichvili . |
| 2,898,435 | 8/1959 | Crafts . |
| 2,984,732 | 5/1961 | Herbert . |
| 3,101,403 | 8/1963 | Lewis et al. . |
| 3,110,961 | 11/1963 | Melill et al. . |
| 3,183,460 | 5/1965 | Bennon . |
| 3,288,979 | 11/1966 | Mills et al. . |
| 3,395,261 | 7/1968 | Leatherman et al. . |
| 3,431,379 | 3/1969 | Yrene . |
| 3,444,275 | 5/1969 | Willett . |
| 3,450,856 | 6/1969 | Buck et al. . |
| 3,492,453 | 1/1970 | Hurst . |
| 3,507,735 | 4/1970 | Chisholm . |
| 3,529,458 | 9/1970 | Butler et al. . |
| 3,547,751 | 12/1970 | Morgan . |
| 3,574,031 | 4/1971 | Heller, Jr. et al. .............. 219/633 |
| 3,595,060 | 7/1971 | Hundy . |

(List continued on next page.)

FOREIGN PATENT DOCUMENTS

| | | |
|---|---|---|
| 0461979B1 | 4/1994 | European Pat. Off. . |
| 54-25542 | 2/1979 | Japan . |
| 1418327 | 12/1975 | United Kingdom . |

OTHER PUBLICATIONS

J. Giachino, Welding Skills and Practices, Am. Tech. Soc., Chicago, IL (1960,1965,1967,1971,1976) 393–401.

Border, et al., "Induction Heated Joining of Thermoplastic Composites Without Metal Susceptors," *34th International SAMPE Symposium*, May 8–11, 1989, pp. 2569–2578.

Sumida, et al., "Pan Based High Modulus Graphitized Carbon Fiber Torayca M60J", *34th International SAMPE Symposium*, May 8–11, 1989, pp. 2579–2589.

*Primary Examiner*—Tu Hoang
*Attorney, Agent, or Firm*—John C. Hammar

[57] ABSTRACT

A fixed coil induction heater produces quality thermoplastic fusion welds in prefabricated resin composite parts. A susceptor along a bondline between parts aligns with the induction coil segments of a solenoid induction coil along the centerline of the coil. Energizing the coil heats the susceptor to form the weld at the bondline. For this operation, our induction heating workcell uses complementary dies that define a central cavity with an oval pattern of induction coil segments roughly conforming to the shape of the cavity and surrounding all faces of the cavity where we position the preform composite parts and susceptor.

15 Claims, 4 Drawing Sheets

U.S. PATENT DOCUMENTS

| | | |
|---|---|---|
| 3,605,477 | 9/1971 | Carlson . |
| 3,661,491 | 5/1972 | Troyer . |
| 3,705,284 | 12/1972 | Binard . |
| 3,845,268 | 10/1974 | Sindt . |
| 3,864,186 | 2/1975 | Balla . |
| 3,890,819 | 6/1975 | DeLuca . |
| 3,895,436 | 7/1975 | Summers et al. . |
| 3,920,175 | 11/1975 | Hamilton et al. . |
| 3,924,793 | 12/1975 | Summers et al. . |
| 3,927,817 | 12/1975 | Hamilton et al. . |
| 3,934,441 | 1/1976 | Hamilton et al. . |
| 3,941,643 | 3/1976 | Balla . |
| 3,946,349 | 3/1976 | Haldeman, III . |
| 3,974,673 | 8/1976 | Fosness et al. . |
| 3,996,019 | 12/1976 | Cogan . |
| 3,996,402 | 12/1976 | Sindt . |
| 4,005,302 | 1/1977 | Graf et al. . |
| 4,029,837 | 6/1977 | Leatherman . |
| 4,029,926 | 6/1977 | Austin . |
| 4,060,364 | 11/1977 | Gras . |
| 4,091,254 | 5/1978 | Struve . |
| 4,111,024 | 9/1978 | Dahlman et al. . |
| 4,117,970 | 10/1978 | Hamilton et al. . |
| 4,120,712 | 10/1978 | Sindt . |
| 4,141,484 | 2/1979 | Hamilton et al. . |
| 4,145,903 | 3/1979 | Leach et al. . |
| 4,150,927 | 4/1979 | Steingroever .................... 425/3 |
| 4,180,717 | 12/1979 | Lenk et al. . |
| 4,188,811 | 2/1980 | Brimm . |
| 4,217,397 | 8/1980 | Hayase et al. . |
| 4,233,829 | 11/1980 | Hamilton et al. . |
| 4,233,831 | 11/1980 | Hamilton et al. . |
| 4,263,375 | 4/1981 | Elrod . |
| 4,269,053 | 5/1981 | Agrawal et al. . |
| 4,288,673 | 9/1981 | Ishibashi . |
| 4,292,375 | 9/1981 | Ko . |
| 4,296,295 | 10/1981 | Kiuchi . |
| 4,304,821 | 12/1981 | Hayase et al. . |
| 4,304,975 | 12/1981 | Lenk et al. . |
| 4,306,436 | 12/1981 | Schulz et al. . |
| 4,313,777 | 2/1982 | Buckley et al. . |
| 4,331,284 | 5/1982 | Schulz et al. . |
| 4,343,982 | 8/1982 | Schwartz et al. . |
| 4,351,470 | 9/1982 | Swadling et al. . |
| 4,352,280 | 10/1982 | Ghosh . |
| 4,354,369 | 10/1982 | Hamilton . |
| 4,355,222 | 10/1982 | Geithman et al. . |
| 4,361,262 | 11/1982 | Israeli . |
| 4,382,113 | 5/1983 | Schwartz et al. . |
| 4,393,987 | 7/1983 | Anderson et al. . |
| 4,416,713 | 11/1983 | Brooks . |
| 4,421,588 | 12/1983 | Davies . |
| 4,426,032 | 1/1984 | Leodolter . |
| 4,445,951 | 5/1984 | Lind et al. . |
| 4,474,044 | 10/1984 | Leistner et al. . |
| 4,489,123 | 12/1984 | Schijve et al. . |
| 4,521,659 | 6/1985 | Buckley et al. . |
| 4,524,037 | 6/1985 | Marc . |
| 4,530,197 | 7/1985 | Rainville . |
| 4,544,339 | 10/1985 | Itoh . |
| 4,555,373 | 11/1985 | Bloemkolk et al. . |
| 4,563,145 | 1/1986 | de Meij . |
| 4,584,860 | 4/1986 | Leonard . |
| 4,603,089 | 7/1986 | Bampton . |
| 4,603,808 | 8/1986 | Stacher . |
| 4,622,445 | 11/1986 | Matsen . |
| 4,635,461 | 1/1987 | Raymond . |
| 4,649,249 | 3/1987 | Odor . |
| 4,653,396 | 3/1987 | Wennerberg . |
| 4,657,717 | 4/1987 | Cattanach et al. . |
| 4,671,470 | 6/1987 | Jonas . |
| 4,673,450 | 6/1987 | Burke . |
| 4,706,361 | 11/1987 | Meyer et al. . |
| 4,713,953 | 12/1987 | Yavari . |
| 4,716,072 | 12/1987 | Kim . |
| 4,768,433 | 9/1988 | Boissevain . |
| 4,791,260 | 12/1988 | Waldman . |
| 4,822,972 | 4/1989 | Sugioka et al. . |
| 4,824,617 | 4/1989 | Takeuchi et al. . |
| 4,855,011 | 8/1989 | Legge et al. . |
| 4,882,823 | 11/1989 | Weisert et al. . |
| 4,888,973 | 12/1989 | Comley . |
| 4,889,276 | 12/1989 | Cadwell et al. . |
| 4,897,518 | 1/1990 | Mucha et al. . |
| 4,901,552 | 2/1990 | Ginty et al. . |
| 4,904,972 | 2/1990 | Mori et al. . |
| 4,906,172 | 3/1990 | Stewart . |
| 4,919,759 | 4/1990 | Ilmarinen et al. . |
| 4,947,464 | 8/1990 | Mori et al. . |
| 4,951,491 | 8/1990 | Lorenz . |
| 4,978,825 | 12/1990 | Schmidt et al. . |
| 4,984,348 | 1/1991 | Cadwell . |
| 4,988,037 | 1/1991 | Cadwell . |
| 5,001,319 | 3/1991 | Holmstrom . |
| 5,024,369 | 6/1991 | Froes et al. . |
| 5,032,327 | 7/1991 | Becheret . |
| 5,047,605 | 9/1991 | Ogden . |
| 5,064,978 | 11/1991 | Scholz . |
| 5,074,019 | 12/1991 | Link . |
| 5,079,817 | 1/1992 | Anstotz et al. . |
| 5,093,545 | 3/1992 | McGaffigan . |
| 5,101,086 | 3/1992 | Dion et al. . |
| 5,115,963 | 5/1992 | Yasui . |
| 5,118,026 | 6/1992 | Stacher . |
| 5,139,407 | 8/1992 | Kim et al. . |
| 5,141,146 | 8/1992 | Yasui . |
| 5,199,791 | 4/1993 | Kasanami et al. . |
| 5,229,562 | 7/1993 | Burnett et al. . |
| 5,240,542 | 8/1993 | Miller et al. . |
| 5,248,864 | 9/1993 | Kodokian . |
| 5,250,776 | 10/1993 | Pfaffmann . |
| 5,283,409 | 2/1994 | Brendel et al. . |
| 5,313,034 | 5/1994 | Grimm et al. . |
| 5,313,037 | 5/1994 | Hansen et al. . |
| 5,338,497 | 8/1994 | Murray et al. ............. 219/633 |
| 5,420,400 | 5/1995 | Matsen ................... 219/615 |
| 5,444,220 | 8/1995 | Hansen et al. ............. 219/633 |

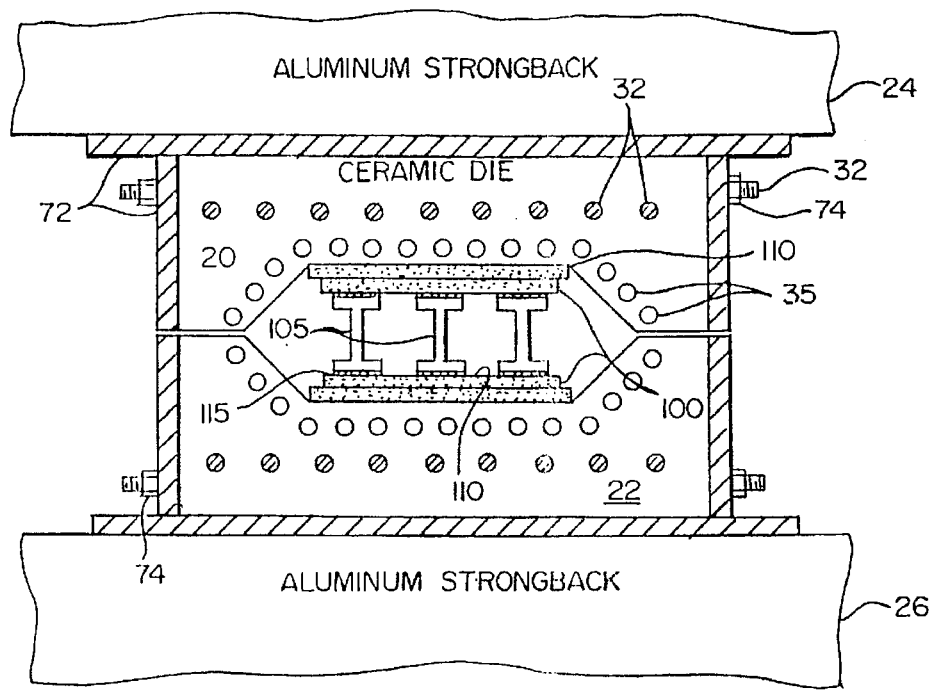
FIG. 3
FIG. 4
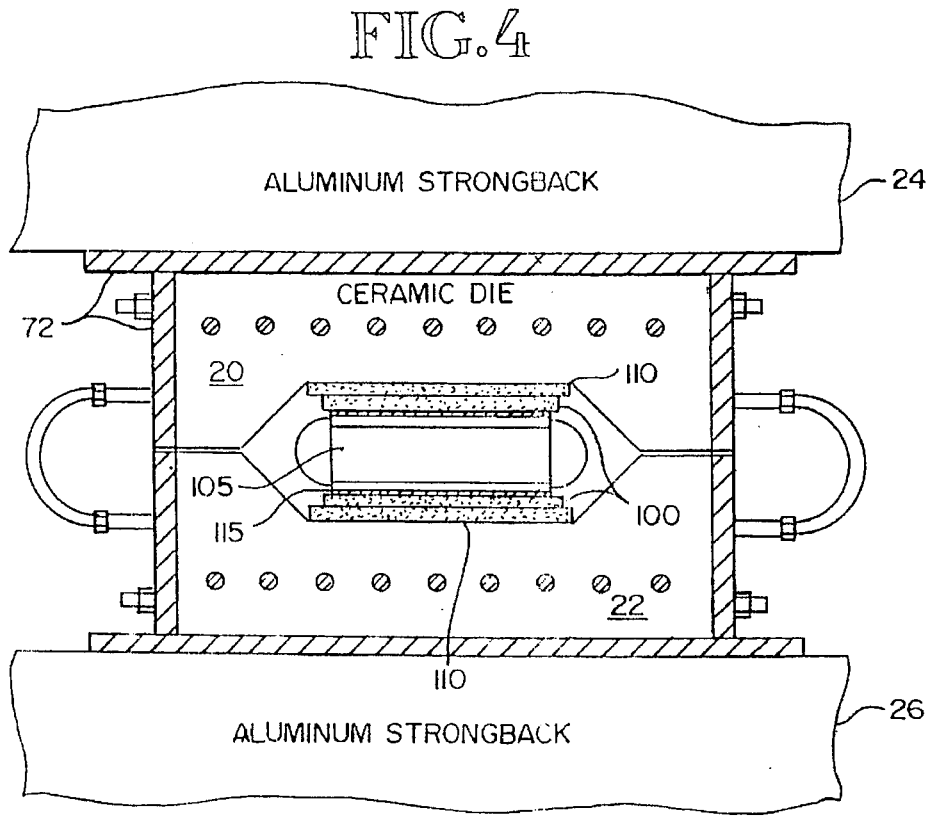

FIXED COIL INDUCTION HEATER FOR THERMOPLASTIC WELDING

REFERENCE TO RELATED APPLICATIONS

The present invention is a continuation-in-part application based upon U.S. patent application Ser. No. 08/341,779, filed Nov. 18, 1994; which was a continuation-in-part application based upon U.S. patent application Ser. No. 08/169, 655, filed Dec. 16, 1993 now U.S. Pat. No. 5,530,227; which was a continuation-in-part application of U.S. patent application Ser. No. 07/777,739, filed Oct. 15, 1991 now U.S. Pat. No. 5,410,132. U.S. patent application Ser. No. 08/341,779 also was a continuation-in-part application based upon U.S. patent application Ser. No. 08/092,050, filed Jul. 15, 1993 now U.S. Pat. No. 5,410,133; which was a divisional of U.S. patent application Ser. No. 07/681,004, filed Apr. 5, 1991, now U.S. Pat. No. 5,229,562; and finally, was a continuation-in-part application based upon U.S. patent application Ser. No. 08/151,433, filed Nov. 12, 1993 now U.S. Pat. No. 5,420,400. We incorporate these applications and patents by reference.

TECHNICAL FIELD

The present invention relates to a fixed coil induction heating workcell including matched dies that include coil segments on all sides of the workpiece.

BACKGROUND ART.

1. Composite Manufacturing

Fiber-reinforced organic resin matrix composites have a high strength-to-weight ratio or a high stiffness-to-weight ratio and desirable fatigue characteristics that make them increasingly popular as a replacement for metal in aerospace applications where weight, strength, or fatigue is critical. Organic resin composites, be they thermoplastics or thermosets, are expensive today. Improved manufacturing processes would reduce touch labor and forming time.

Prepregs combine continuous, woven, or chopped reinforcing fibers with an uncured, matrix resin, and usually comprise fiber sheets with a thin film of the matrix. Sheets of prepreg generally are placed (laid-up) by hand or with fiber placement machines directly upon a tool or die having a forming surface contoured to the desired shape of the completed part or are laid-up in a flat sheet which is then draped and formed over the tool or die to the contour of the tool. Then the resin in the prepreg lay up is consolidated (i.e. pressed to remove any air, gas, or vapor) and cured (i.e., chemically converted to its final form usually through chain-extension) in a vacuum bag process in an autoclave (i.e., a pressure oven) to complete the part.

The tools or dies for composite processing typically are formed to close dimensional tolerances. They are massive, must be heated along with the workpiece, and must be cooled prior to removing the completed part. The delay caused to heat and to cool the mass of the tools adds substantially to the overall time necessary to fabricate each part. These delays are especially significant when the manufacturing run is low rate where the dies need to be changed frequently, often after producing only a few parts of each kind. An autoclave has similar limitations; it is a batch operation.

In hot press forming, the prepreg is laid-up to create a preform, which is bagged (if necessary), and placed between matched metal tools that include forming surfaces to define the internal, external, or both mold lines of the completed part. The tools and composite preform are placed within a press and then the tools, press, and preform are heated.

The tooling in autoclave or hot press fabrication is a significant heat sink that consumes substantial energy. Furthermore, the tooling takes significant time to heat the composite material to its consolidation temperature and, after curing the composite, to cool to a temperature at which it is safe to remove the finished composite part.

As described in U.S. Pat. No. 4,657,717, a flat composite prepreg panel was sandwiched between two metal sheets made from a superplastically formable alloy and then formed against a die having a surface precisely contoured to the final shape of the part.

Attempts have been made to reduce composite fabrication times by actively cooling the tools after forming the composite part. These attempts have shortened the time necessary to produce a composite part, but the cycle time for and cost of heating and cooling remain significant contributors to overall fabrication costs. Designing and making tools to permit their active cooling increases their cost.

Boeing described a process for organic matrix forming and consolidation using induction heating in U.S. patent application Ser. No. 08/169,655. There, prepregs were laid up in a flat sheet and were sandwiched between aluminum susceptor facesheets. The facesheets were susceptible to heating by induction and formed a retort to enclose the prepreg preform. To ensure an inert atmosphere around the composite during curing and to permit withdrawing volatiles and outgassing from around the composite during the consolidation, we welded the facesheets around their periphery. Such welding unduly impacts the preparation time and the cost for part fabrication. It also ruined the facesheets (i.e., prohibited their reuse which added a significant cost penalty to each part fabricated with this approach). Boeing also described in U.S. patent application Ser. No. 08/341, 779 a technique that readily and reliably seals facesheets of the retort without the need for welding and permits reuse of the facesheets in certain circumstances. Our "bag-and-seal" technique applies to both resin composite and metal processing.

2. Processing in an Induction Press

The dies or tooling for induction processing are ceramic because a ceramic is not susceptible to induction heating and, preferably, is a thermal insulator (i.e., a relatively poor conductor of heat). Cast ceramic tooling is strengthened and reinforced internally, with fiberglass rods or other appropriate reinforcements and externally with metal or other durable strongbacks to permit it to withstand the temperatures and pressures necessary to form, to consolidate, or otherwise to process the composite materials or metals. Cast ceramic tools cost less to fabricate than metal tools of comparable size and have less thermal mass than metal tooling, because they are unaffected by the induction field. Because the ceramic tooling is not susceptible to induction heating, it is possible to embed induction heating elements in the ceramic tooling and to heat the composite or metal retort without significantly heating the tools. The induction heating elements themselves connect to form a water cooling network. Thus, induction heating can reduce the time required and energy consumed to fabricate a part.

While graphite or boron fibers can be heated directly by induction, most organic matrix composites require a susceptor in or adjacent to the composite material preform to achieve the necessary heating for consolidation or forming. The susceptor is heated inductively and transfers its heat principally through conduction to the preform or workpiece that, in our prior work, is sealed within the susceptor retort. Enclosed in the metal retort, the workpiece does not experience the oscillating magnetic field which instead is absorbed in the retort sheets. Heating is by conduction from the retort to the workpiece.

Induction focuses heating on the retort (and workpiece) and eliminates wasteful, inefficient heat sinks. Because the ceramic tools in our induction heating workcell do not heat to as high a temperature as the metal tooling of conventional, prior art presses, problems caused by different coefficients of thermal expansion between the tools and the workpiece are reduced. Furthermore, we are energy efficient because significantly higher percentages of our input energy go to heating the workpiece than occurs with conventional presses. Our reduced thermal mass and ability to focus the heating energy permits us to change the operating temperature rapidly which improves the products we produce. Finally, our shop environment is not heated as significantly from the radiation of the large thermal mass of a conventional press, and is a safer and more pleasant environment for the press operators.

In induction heating for consolidating and/or forming organic matrix composite materials, we place a thermoplastic organic matrix composite preform of PEEK or ULTEM, for example, within a metal susceptor envelope (i.e., retort). These thermoplastics have a low concentration of residual volatile solvents and are easy to use. The susceptor facesheets of the retort are inductively heated to heat the preform. We apply consolidation and forming pressure to consolidate and, if applicable, to form the preform at its curing temperature. The sealed susceptor sheets form a pressure zone. We evacuate the pressure zone in the retort in a manner analogous to conventional vacuum bag processes for resin consolidation, or, for low volatiles resins, like ULTEM, we can pressurize this zone to enhance consolidation. The retort is placed in an induction heating press on the forming surfaces of dies having the desired shape of the molded composite part. After the retort (and preform) are inductively heated to the desired elevated temperature, we apply differential pressure (while maintaining the vacuum in the pressure zone around the preform) across the retort which functions as a diaphragm in the press to form the preform against the die into the desired shape of the completed composite panel.

The retort often includes three susceptor sheets sealed around their periphery to define two pressure zones. The first pressure zone surrounds the composite panel/preform or metal workpiece and is evacuated and maintained under vacuum. The second pressure zone is pressurized (i.e., flooded with gas) at the appropriate time and rate to help form the composite panel or workpiece. The shared wall of the three layer sandwich that defines the two pressure zones acts as a diaphragm in this situation.

We can perform a wide range of manufacturing operations in our induction heating press. These operations have optimum operating temperatures ranging from about 350° F. (175° C.) to about 1950° F. (1066° C.). For each operation, we usually need to hold the temperature relatively constant for several minutes to several hours while we complete the operations. While we can achieve temperature control by controlling the input power fed to the induction coil, we have discovered a better and simpler way that capitalizes on the Curie temperature. By judicious selection of the metal or alloy in the retort's susceptor facesheets, we can avoid excessive heating irrespective of the input power. With improved control and improved temperature uniformity in the workpiece, we produce better products. Our method capitalizes on the Curie temperature phenomenon to control the absolute temperature of the workpiece and to obtain substantial thermal uniformity in the workpiece, by matching the Curie temperature of the susceptor to the desired temperature of the induction heating operation being performed. This temperature control method is explained in greater detail in our U.S. patent application Ser. No. 08/469, 604 by Hansen et al. entitled Method for Achieving Thermal Uniformity in Induction Processing of Organic Matrix Composites or Metals, which we incorporate by reference.

3. Thermoplastic Welding

Three major joining technologies exist for aerospace composite structure: mechanical fastening; adhesive bonding; and welding. Both mechanical fastening and adhesive bonding are costly, time consuming assembly steps that introduce excess cost even if the parts that are assembled are fabricated from components produced by an emerging, cost efficient process. Mechanical fastening requires expensive hole locating, drilling, shimming, and fastener installation, while adhesive bonding often requires complicated surface pretreatments.

In contrast, thermoplastic welding, which eliminates fasteners, features the ability to join thermoplastic composite components at high speeds with minimum touch labor and little, if any, pretreatments. In our experience, the welding interlayer (comprising the susceptor and surrounding thermoplastic resin either coating the susceptor or sandwiching it) also can simultaneously take the place of shims required in mechanical fastening. As such, composite welding holds promise to be an affordable joining process. For "welding" thermoplastic and thermoset composite parts together, the resin that the susceptor melts functions as a hot melt adhesive. If fully realized, the thermoplastic-thermoset bonding will further reduce the cost of composite assembly.

There is a large stake in developing a successful induction welding process. Its advantages versus traditional composite joining methods are:

reduced parts count versus fasteners minimal surface preparation, in most cases a simple solvent wipe to remove surface contaminants indefinite shelf life at room temperature short process cycle time, typically measured in minutes enhanced joint performance, especially hot/wet and fatigue permits rapid field repair of composites or other structures.

There is little or no loss of bond strength after prolonged exposure to environmental influences.

U.S. Pat. No. 4,673,450 describes a method to spot weld graphite fiber reinforced PEEK composites using a pair of electrodes. After roughening the surfaces of the prefabricated PEEK composites in the region of the bond, Burke placed a PEEK adhesive ply along the bond line, applied a pressure of about 50–100 psi through the electrodes, and heated the embedded graphite fibers by applying a voltage in the range of 20–40 volts at 30– 40 amps for approximately 5–10 seconds with the electrodes. Access to both sides of the assembly is required in this process which limits its application.

Prior art disclosing thermoplastic welding with induction heating is illustrated by U.S. Pat. Nos. 3,966,402 and 4,120,712. In these patents, the metallic susceptors used are of a conventional type having a regular pattern of openings of traditional manufacture. Achieving a uniform, controllable temperature in the bondline, which is crucial to preparing a thermoplastic weld of adequate integrity to permit use of welding in aerospace primary structure, is difficult with those conventional susceptors, as we discussed and illustrated in our copending U.S. Pat. No. 5,313,037.

Thermoplastic welding is a process for forming a fusion bond between two faying thermoplastic faces of two parts. A fusion bond is created when the thermoplastic on the surface of the two thermoplastic composite parts is heated to the melting or softening point and the two surfaces are brought into contact, so that the molten thermoplastic mixes, and the surfaces are held in contact while the thermoplastic cools below the softening temperature.

Simple as the thermoplastic welding process sounds, and easy as it is to perform in the laboratory on small pieces, it becomes difficult to perform reliably and repeatably in a real factory on full-scale parts to build a large structure such as an airplane wing box. The difficulty is in getting the proper amount of heat to the bondline without overheating the entire structure, and also in achieving intimate contact of the faying surfaces of the two parts at the bondline during heating and cooling despite the normal imperfections in the flatness of composite parts, thermal expansion of the thermoplastic during heating to the softening or melting temperature, flow of the thermoplastic out of the bondline under pressure (i.e., squeeze out), and then contraction of the thermoplastic in the bondline during cooling.

The exponential decay of the strength of magnetic fields dictates that, in induction welding processes, the susceptible structure closest to the induction coil will be the hottest, since it experiences the strongest field. Therefore, it is difficult to obtain adequate heating at the bond line between two graphite or carbon fiber reinforced resin matrix composites relying on the susceptibility of the fibers alone as the source of heating in the assembly. For the inner plies to be hot enough to melt the resin, the outer plies closer to the induction coil and in the stronger magnetic field are too hot. The matrix resin in the entire piece of composite melts. The overheating results in porosity in the product, delamination, and, in some case, destruction or denaturing of the resin. To avoid overheating of the outer plies and to insure adequate heating of the inner plies, we use a susceptor of significantly higher conductivity than the fibers to peak the heating selectively at the bondline. An electromagnetic induction coil heats a susceptor to melt and cure a thermoplastic resin (also sometimes referred to as an adhesive) to bond the elements of the assembly together.

The current density in the susceptor may be higher at the edges of the susceptor than in the center because of the nonlinearity of the coil, such as occurs when using a cup core induction coil like that described in U.S. Pat. No. 5,313,037. Overheating the edges of the assembly can result in underheating the center, either condition leading to inferior welds because of non-uniform curing. It is necessary to have an open or mesh pattern in the susceptor embedded at the bondline to allow the resin to create the fusion bond between the composite elements of the assembly when the resin heats and melts.

a. Moving Coil Welding Processes

In U.S. Pat. No. 5,500,511, we described a tailored susceptor for approaching the desired temperature uniformity. This susceptor, designed for use with the cup coil of U.S. Pat. No. 5,313,037, relied upon carefully controlling the geometry of openings in the susceptor (both their orientation and their spacing) to distribute the heat evenly. We suggested using a regular array of anisotropic, diamond shaped openings with a ratio of the length (L) to the width (W) greater than 1 to provide a superior weld by producing a more uniform temperature than obtainable using a susceptor having a similar array, but one where the L/W ratio was one. By changing the length to width ratio (the aspect ratio) of the diamond-shaped openings in the susceptor, we achieved a large difference in the longitudinal and transverse conductivity in the susceptor, and, thereby, tailored the current density within the susceptor. A tailored susceptor having openings with a length (L) to width (W) ratio of 2:1 has a longitudinal conductivity about four times the transverse conductivity. In addition to tailoring the shape of the openings to tailor the susceptor, we altered the current density in regions near the edges by increasing the foil density (i.e., the absolute amount of metal). Increasing the foil density along the edge of the susceptor increases the conductivity along the edge and reduces the current density and the edge heating. We increased foil density by folding the susceptor to form edge strips of double thickness or by compressing openings near the edge of an otherwise uniform susceptor. We found these susceptors difficult to reproduce reliably. Also, their use forced careful placement and alignment to achieve the desired effect.

The tailored susceptor was designed to use with the cup coil of U.S. Pat. No. 5,313,037, where the magnetic field is strongest near the edges because the central pole creates a null at the center. Therefore, the tailored susceptor was designed to counter the higher field at the edges by accommodating the induced current near the edges. The high longitudinal conductivity encouraged induced currents to flow longitudinally.

Our selvaged susceptor for thermoplastic welding which is described in U.S. Pat. No. 5,508,496 controls the current density pattern during eddy current heating by an induction coil to provide substantially uniform heating to a composite assembly and to insure the strength and integrity of the weld in the completed part. This susceptor is particularly desirable for welding ribs between prior welded spars using an asymmetric induction coil (described in U.S. Pat. No. 5,444,220, which we incorporate by reference), because, with that coil, it provides a controllable area of intense, uniform heating, a trailing region with essentially no heating, and a leading region with minor preheating.

The power (P) [or power density] which the susceptor dissipates as heat follows the well-known equation for power loss in a resistor: $P=(J^2)(R)$ wherein J is the eddy current (or its density) and R is the impedance (i.e., resistance) of any segment of the eddy path. The heating achieved directly corresponds to the power (or power density).

We achieve better performance (i.e., more uniform heating) in rib welding by using a selvaged susceptor having edge strips without openings. The resulting susceptor, then, has a center portion with a regular pattern of opening and solid foil edges, which we refer to as selvage edge strips. We embed the susceptor in a thermoplastic resin to make a susceptor/resin tape that is easy to handle and to use in performing the composite pieces prior to welding. Also, we have discovered that, with a selvaged susceptor, the impedance of the central portion should be anisotropic with a lower transverse impedance than the longitudinal impedance. Here, the L/W ratio of diamond shaped openings should be less than or equal to one. That is, unlike our tailored susceptor of U.S. Pat. No. 5,500,511, L for the selvaged susceptor should be less than W. With this new selvaged susceptor in the region immediately under the asymmetric induction work coil, we encourage the current to flow across the susceptor to the edges where the current density is lowest and the conductivity, highest.

Generally, we form the selvaged susceptor somewhat wider than normal so that the selvage edge strips are not in the bondline. We remove the selvage edge strips after forming the weld, leaving only a perforated susceptor foil in the weld. This foil has a relatively high open area fraction.

Significant effort has been expended in developing inductor and susceptor systems to optimize the heating of the bondline in thermoplastic assemblies. Induction coil structures and tailored susceptors have now been developed that provide adequate control and uniformity of heating of the bondline, but a big hurdle remaining to perfecting the process to the point of practical utility for producing large scale aerospace-quality structures in a production environment is the aspect of the process dealing with the control of the surface contact of the faying surfaces of the two parts to be welded together, and the timing, intensity, and schedule of heat application so the material at the faying surfaces is brought to and maintained within the proper temperature range for the requisite amount of time for an adequate bond to form, and is maintained in intimate contact while the melted or softened material hardens in its bonded condition.

Large scale parts such as wing spars and ribs, and the wing skins that are bonded to the spars and ribs, are typically on the order of 20–30 feet long at present, and potentially can be hundreds of feet in length when the process is perfected for commercial transport aircraft. Parts of this magnitude are difficult to produce with perfect flatness. Instead, the typical part will have various combinations of surface deviations from perfect flatness, including large scale waviness in the direction of the major length dimension, twist about the longitudinal axis, dishing or sagging of "T" beam flanges, and small scale surface defects such as asperities and depressions. These irregularities interfere with full surface area contact between the faying surfaces of the two parts and actually result in surface contact only at a few "high points" across the intended bondline. Additional surface contact can be achieved by applying pressure to the parts to force the faying surfaces into contact, but full intimate contact is difficult or impossible to achieve in this way. Applying heat to the interface by electrically heating the susceptor in connection with pressure on the parts tends to flatten the irregularities further, but the time needed to achieve full intimate contact with the use of heat and pressure is excessive, can result in deformation of the top part, and tends to raise the overall temperature of the "T" beam flanges to the softening point, so they begin to yield or sag under the application of the pressure needed to achieve a good bond.

Our multipass thermoplastic welding process described in U.S. Pat. No. 5,486,684 enables a moving coil welding process to produce continuous or nearly continuous fusion bonds over the full area of the bondline to yield very high strength welds reliably, repeatably and with consistent quality. This process produces improved low cost, high strength composite assemblies of large scale parts fusion bonded together with consistent quality, and uses a schedule of heat application that maintains the overall temperature of the structure within the limit in which it retains its high strength, so it requires no internal tooling to support the structure against sagging which otherwise could occur above the high strength temperature limit. The process also produces nearly complete bondline area fusion on standard production composite material parts having the usual surface imperfections and deviations from perfect flatness, while eliminating fasteners and the expense of drilling holes, inspecting the holes and the fasteners, inspecting the fasteners after installation, sealing between the parts and around the fastener and the holes; reducing mismatch of materials; and eliminating arcing from the fasteners.

In the process, an induction heating work coil is passed multiple times over a bondline while applying pressure in the region of the coil to the components to be welded, and maintaining the pressure until the resin hardens. The resin at the bondline is heated to the softening or melting temperature with each pass of the induction work coil and pressure is exerted to flow the softened/melted resin in the bondline and reduce the thickness of the bondline while improving the intimacy of the faying surface contact with each pass to militate for complete continuity of bond. The total time at the softened or melted condition of the thermoplastic in the faying surfaces is sufficient to attain deep interdiffusion of the polymer chains in the materials of the two faying surfaces throughout the entire length and area of the bondline, thereby producing a bondline of improved strength and integrity in the completed part, but the total time of the faying surfaces at softened temperature is in separate time segments which allows time for the heat in the interface to dissipate without raising the temperature of the entire structure to the degree at which it loses its strength and begins to sag, so the desired shape and size of the final assembly is maintained.

A structural susceptor allows us to include fiber reinforcement within the weld resin to alleviate residual tensile strain otherwise present in an unreinforced weld. The susceptor includes alternating layers of thin film thermoplastic resin sheets and fiber reinforcement (usually woven fiberglass fiber) sandwiching the conventional metal susceptor that is embedded in the resin. While the number of total plies in this structural susceptor is usually not critical, we prefer to use at least two plies of fiber reinforcement on each side of the susceptor. This structural susceptor is described in greater detail in our U.S patent application Ser. No. 08/471,625 entitled A Structural Susceptor for Thermoplastic Welding, which we incorporate by reference.

The structural susceptor permits gap filling between the welded composite laminates which tailors the thickness (number of plies) in the structural susceptor to fill the gaps, thereby eliminating costly profilometry of the faying surfaces and the inherent associated problem of resin depletion at the faying surfaces caused by machining the surfaces to have complementary contours. Standard manufacturing tolerances produce gaps as large as 0.120 inch, which is too wide to create a quality weld using the conventional susceptors.

We can easily tailor the thickness of the structural susceptor to match the measured gap by scoring through the appropriate number of plies of resin and fiber reinforcement and peeling them off. In doing so, a resin side layer will be on both faying surfaces and this layer should insure better performance from the weld.

b. Fixed Coil Induction Welding

We have also experimented with thermoplastic welding using our induction heating workcell and, of course, discovered that the process differs from the moving coil processes because of the coil design and resulting magnetic field. We believe that our fixed coil workcell presents promise for welding at faster cycle times than the moving coil processes because we can heat multiple susceptors simultaneously. The keys to the process, however, are achieving controllable temperatures at the bondline in a reliable and reproducible process that assure quality welds of high bond strength. Our fixed coil induces currents to flow in the susceptor differently from the moving coils and covers a larger area. Nevertheless, we have developed processing parameters that permit welding with our induction heating workcell using a susceptor at the bondline. These processes are described in our U.S. patent applications Ser. No. 08/469,085 entitled Thermoplastic Welding of Organic Matrix Composites Using a Fixed Coil Induction Heater and Ser. No. 08/469, 986 entitled A Reinforced Susceptor for Induction or Resistance Welding of Thermoplastic Composites.

Another advantage with the fixed coil process is that welding can occur using the same tooling and processing equipment that we use to consolidate the skin, thereby greatly reducing tooling costs. Finally, the fixed coil heats the entire bondline at one time to eliminate the need for shims or profile matching machining that are currently used with the moving coil. We can control the temperature and protect against overheating by using our "smart" susceptors as a retort or as the bondline susceptor material or both.

SUMMARY OF THE INVENTION

The present invention to an improved induction heating workcell for thermoplastic welding with a susceptor embedded in the bondline which surrounds the workpiece with a fixed solenoid coil rather than using moving coil technologies. To accomplish the welding, we alter our ceramic die design to accomodate the relatively large and massive aerospace structure to create a central cavity in which to hold the assembly of the prefabricated composite parts with a susceptor along the bondline, similar to the assembly we would use if we were using a moving coil. We can weld, for example, a wingbox or wingtip. Because this cavity has appreciable depth (i.e., the distance between the mold surfaces of the upper and lower die), we arrange segments of the induction coil along the sides of the cavity rather than simply on the top and bottom as we did in our prior workcells. With the coil surrounding the workpiece on all sides rather than merely in spaced, parallel orientation, we produce a field which is more uniform at a given power level and instant in time. Such control is important when simultaneously welding multiple bondlines spatially separated in a wingbox assembly of spars, ribs, closeouts, and skins. We generally connect the susceptor that extends along the top of each spar cap with jumpers to the susceptor that extends along the corresponding bottom spar cap to form a loop current path for the induced eddy currents. We orient the susceptors to extend longitudinally with the induction coils in the dies. When we energize the coil, we create a current in the susceptors, heat the susceptors, and, in turn, simultaneously melt and fuse the thermoplastic resin along the bondlines.

BRIEF DESCRIPTION OF THE DRAWINGS

FIG. 3 is a schematic cross-sectional view of our induction heating workcell adapted for thermoplastic welding of a wingskin/spar assembly in accordance with the present invention.

FIG. 4 is another schematic cross-sectional view of the workcell of FIG. 3 rotated 90° from the view in FIG. 3.

DETAILED DESCRIPTION OF A PREFERRED EMBODIMENT

1. The Induction Heating Press

Figure 1:
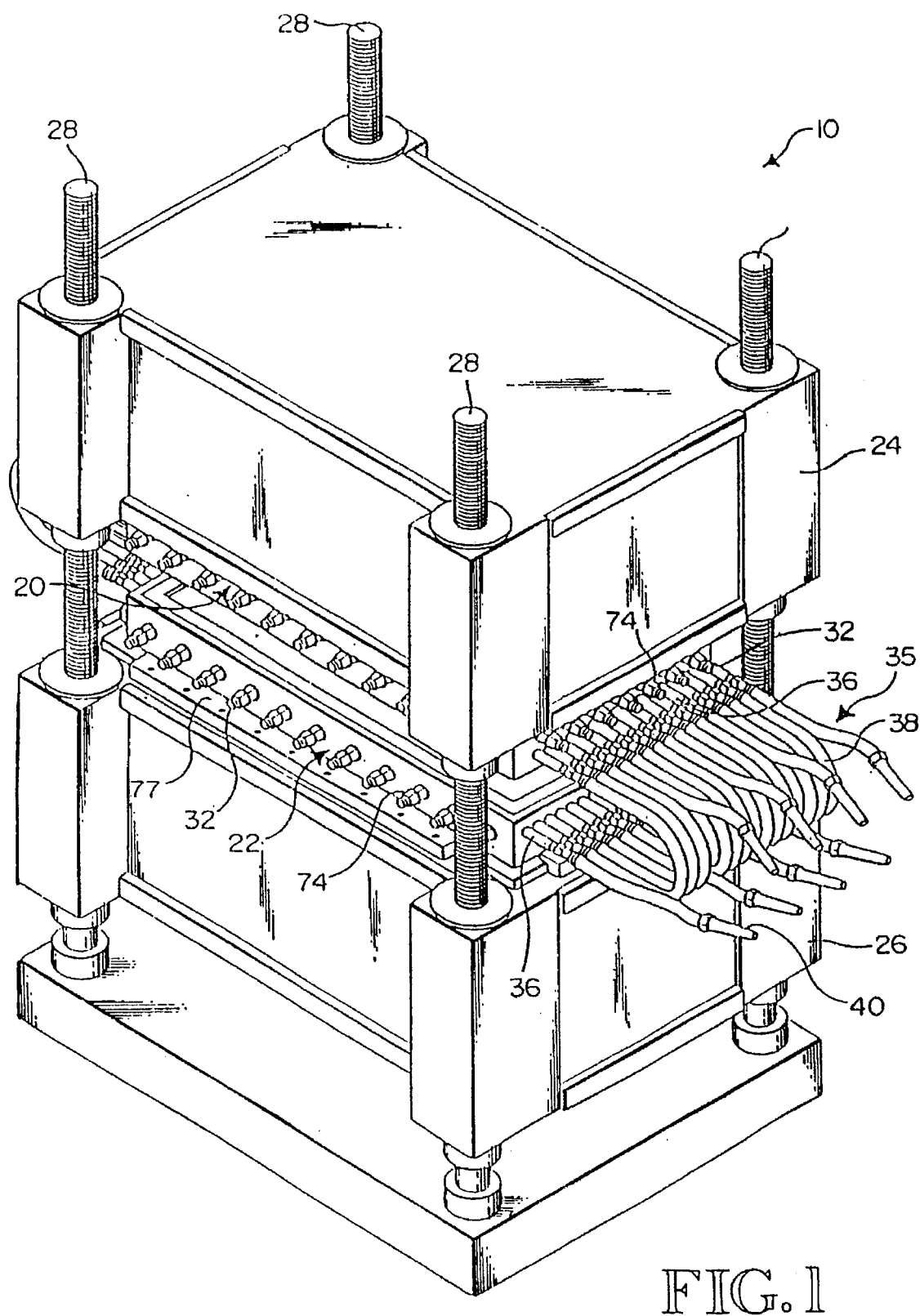
FIG. 1 is a perspective view of our induction heating workcell.

In FIG. 1, an induction heating workcell 10 includes tools or dies 20 and 22 mounted within an upper 24 and a lower 26 strongback. The strongbacks are each threaded onto four threaded column supports or jackscrews 28 or they float free on the columns and are fixed with nuts. We can turn the jackscrews to move one strongback relative to the other. The strongbacks 24 and 26 provide a rigid, flat backing surface for the upper and lower dies 20 and 22 to prevent the dies from bending and cracking during manufacturing operations. Preferably, the strongbacks hold the dies to a surface tolerance of ±0.003 in/ft$^2$ of the forming surface. Such tolerances are desirable to achieve proper part tolerances. The strongbacks may be steel, aluminum, or any other material capable of handling the loads present during forming or consolidation, but we prefer materials that are non-magnetic to avoid any distortion to the magnetic field that our induction coils produce. In some circumstances, the dies may be strong enough themselves that strongbacks are unnecessary. The strongbacks transfer pressure input through the columns evenly to the dies.

The dies 20 and 22 are usually ceramic and are reinforced with a plurality of fiberglass rods 32 that are held with bolts 74 and that extend both longitudinally and transversely in a grid through each die. Each die usually is framed with phenolic reinforcement 72 as well, to maintain a compressive load on the die. Each die may be attached to its strongback by any suitable fastening device such as bolting or clamping. In the preferred embodiment, both dies are mounted on support plates 76 which are held in place on the respective strongbacks through the use of clamping bars 77. The clamping bars 77 extend around the periphery of the support plates 76 and are bolted to the respective strongbacks through the use of fasteners (not shown).

The dies should not be susceptible to inductive heating so that heating is localized in the retort rather than distributed in the press as well. We prefer a ceramic that has a low coefficient of thermal expansion, good thermal shock resistance, and relatively high compression strength, such as a castable fused silica ceramic.

We embed portions of an induction coil 35 in the dies. In FIG. 1 we show four separate induction segments on the top and bottom, but the number usually is higher, as shown in FIG. 3, and, for welding, the segments generally surround the cavity on all sides. Each segment is formed from a straight tubing section 36 that extends along the length of each die and a flexible coil connector 38 that joins the straight tubing sections 36 in the upper die 20 to the corresponding straight tubing section in the lower die 22. Connectors 40 located at the ends of the induction coil 35 connect the induction coil 35 to an external power source or coil driver 50 and to a circulation system for cooling fluid. Although shown as round tubing sections, the shape is arbitrary. We often use rectangular channels.

Cavities 42 and 44 in the respective dies hold tool inserts 46 and 48. The upper tool insert 46 in some applications has a contoured forming surface 58 that has a shape corresponding to the desired shape of the outer mold line surface of the completed composite. The lower tool insert determines the inner mold line. The tool inserts also should not be susceptible to inductive heating, preferably being formed of a castable ceramic. In some cases, both the dies and the tool inserts can be made from a matrix resin rather than from a ceramic. Using a resin, however, limits use of the tooling to low temperature operations, such as forming or consolidating certain organic matrix composites. We prefer ceramic tooling which provides the greatest flexibility and versatility for the induction heating workcell. The forming surfaces can be an integral part of the dies.

Each die surrounds and supports the respective tool insert and holds the straight sections 36 of the induction coil in proper position in relationship to the tool insert 46 or 48. In the preferred embodiment, the interior 70 of the dies is formed of a castable phenolic or ceramic and the exterior sides from precast composite phenolic resin blocks 72. In some applications, we prefer to reinforce the phenolic or ceramic with chopped fibers or nonwoven or woven reinforcing mats.

Figure 2:
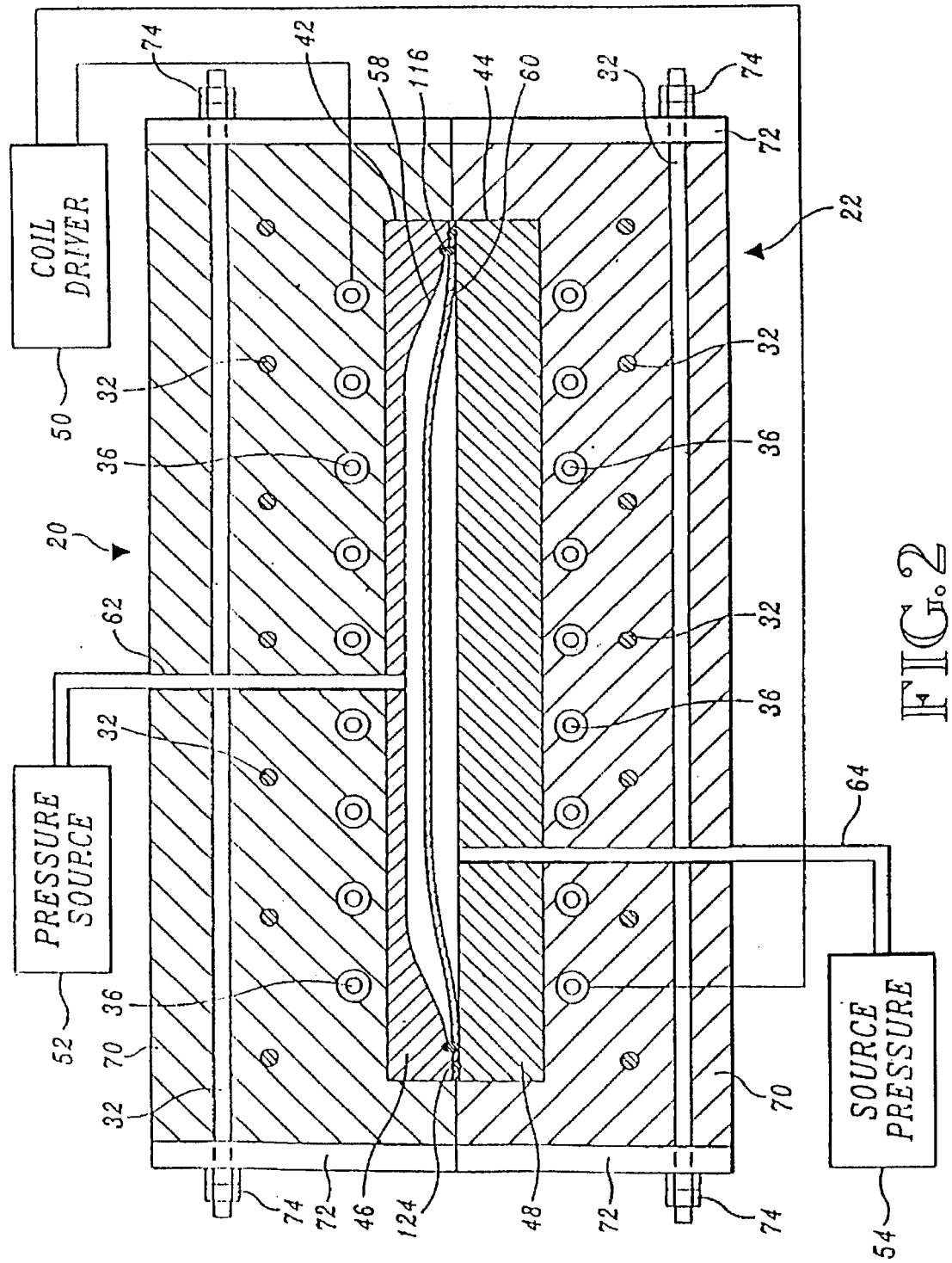
FIG. 2 is a schematic cross sectional view of the induction heating workcell of FIG. 1.
Figure 5:
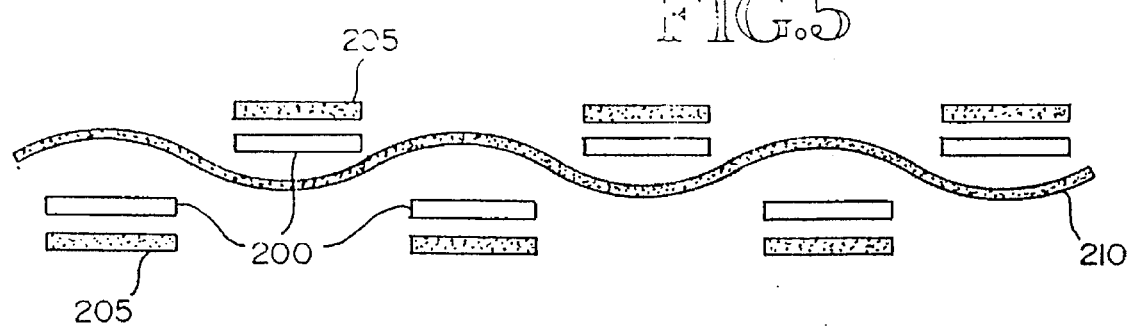
FIG. 5 is a schematic sectional view of a reinforced susceptor that we use for improved bond strength.
Figure 6:
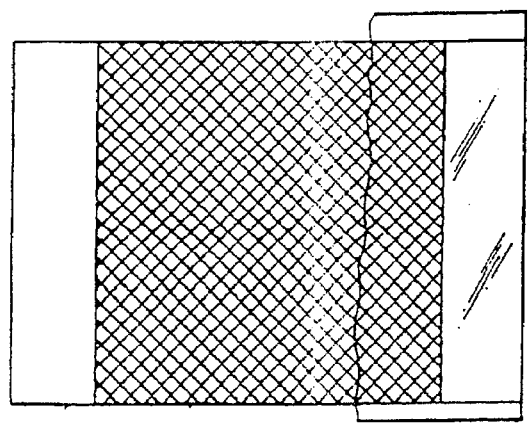
FIG. 6 is a schematic plan view, partially cutaway, of a susceptor tape having a selvaged susceptor embedded within a thermoplastic resin.

FIG. 2 shows a retort 60 between tool inserts 46 and 48. The retort 60 includes a workpiece and sandwiching susceptor facesheets. The retort is heated to a forming or consolidation temperature by energizing the coil 35. In the case of a composite panel, when the panel reaches the consolidation temperature at which the matrix resin flows, we apply gas pressure to the outer surfaces of the retort by pressure sources 52 and 54. Pressure source 52 applies pressure to the upper surface of the retort 60 through a conduit 62 that passes through the upper die 20 and upper tool insert 46, while pressure source 54 applies a pressure to the lower surface of the retort 60 through a conduit 64 that passes through the lower die 22 and lower tool insert 48. The pressure applied to the retort 60 is maintained until the retort has formed to the contour of the forming surface 58 and the matrix resin has consolidated. The pressure sources 52 and 54 generally apply a differential pressure to the retort 60. We do not use a retort in the present invention.

An alternating oscillating electrical current in the induction coil 35 produces a time varying magnetic field that heats the susceptor sheets of the retort via eddy current heating. The frequency at which the coil driver 50 drives the coils 35 depends upon the nature of the retort 60. We power the coil with up to about 400 kW at frequencies of between about 3–10 kHz. Current penetration of copper at 3 kHz is approximately 0.06 inches (1.5 mm), while penetration at 10 kHz is approximately 0.03 inches (0.75 mm).

The shape of the coil has a significant effect upon the magnetic field uniformity. Field uniformity usually is important because temperature uniformity induced in the retort is directly related to the uniformity of the magnetic field. Uniform heating insures that different portions of the workpiece will reach the operating temperature at approximately the same time. Solenoid type induction coils like those we illustrate provide a uniform magnetic field, and are preferred. Greater field uniformity is produced in a retort that is located symmetrically along the centerline of the surrounding coil. Those of ordinary skill can establish series/parallel induction coil combinations, variable turn spacing, and distances between the part and the induction coil by standard electrical calculations to achieve the desired heating from whatever coil configuration is used.

The tool inserts and dies are usually substantially thermally insulating and trap and contain heat within the retort. Since the dies and tool inserts are not inductively heated and act as insulators to maintain heat within the retort, the present invention requires far less energy to achieve the desired operating temperature than conventional autoclave or resistive hot press methods where the metal tooling is a massive heat sink.

The operations using our workcell are faster than prior art operations because we do not heat the large thermal mass of either the dies or tool inserts prior to the induction heating process. The susceptor is heated, the tool is not. Thus, the necessary processing temperature is achieved more rapidly. In addition, the highly conductive materials provide rapid heat transfer to the workpiece. When the driver 50 is de-energized, the dies cool rapidly to a temperature at which we can remove the workpiece from the workcell, saving time and energy over conventional systems. Coolant flowing through the coil tubes functions as an active heat exchanger to transfer heat out of the workpiece, retort, and dies. In addition, the thermal cycle is not as limited by the heating and cooling cycle of the equipment and tools so we can tailor the thermal cycle better to the process for which we are using the induction heating workcell.

2. Thermoplastic Welding

As shown in FIGS. 3 & 4, we make several changes to our induction heating workcell to adapt it to perform bondline thermoplastic welding. First, because the assemblies of primary interest are wingskin/spar combinations and because the parts in these combinations are prefabricated so that the welding operation need only focus upon melting the thermoplastic while applying modest pressure to facilitate the fusion, we create a cavity within our dieset to contain the wingskin/spar combinations. The cavity is substantially a cube or similar rectangular solid with canted edges and has major surfaces complementary to the contour of the wing assembly. Our induction coils usually extend longitudinally in the same direction as the spars and usually are arranged near the surfaces of the major and canted surfaces as shown in FIG. 3. The skins 100 and spars 105 are assembled in the center of the cavity sandwiched, optionally, between optional silicone rubber pressure pads 110 that assure substantially uniform pressure distribution over the wingskin surfaces irrespective of surface features or irregularities. A susceptor tape is positioned along the bondline between the wingskin 100 and the spar caps or we use our reinforced susceptor of U.S. patent application Ser. No. 08/469,986, entitled "A Reinforced Susceptor for Induction or Resistance Welding of Thermoplastic Composites," which we incorporate by reference. By a "susceptor tape" we mean a metal ribbon embedded in thermoplastic resin or a structural susceptor as described in U.S. patent application Ser. No. 08/471,625 having the resin-embedded ribbon sandwiched with alternating plies of thermoplastic film and fiber reinforcement to alleviate residual tensile strain in the weld and to simplify gap filling while ensuring a resin rich, quality weld. The metal ribbon may be copper, a cobalt alloy, nickel-iron alloys, or any other suitable "smart" susceptor from the alternatives discussed in U.S. patent application Ser. No. 08/469,604. The susceptor might be narrow metal strips about 0.10–0.20 in wide held in side-by-side array with the thermoplastic resin or woven with carbon fibers or other reinforcement. The susceptor should have a lower longitudinal impedance to promote longitudinal current flow. We might use a modified, selvaged susceptor (see U.S. patent application Ser. No. 08/314,027) having solid copper bands alternating with mesh sections with the solid bands in the bondline rather than falling outside it, since they are the primary current carriers. Generally, the susceptor is a multistrip susceptor having a plurality of carrier strips about 0.10 in wide separated by 0.20 in wide gaps with periodic transverse positioning strips joining adjacent carrier strips.

A "susceptor tape," however, still suffers from a relatively low bond strength because the metal susceptor is asked to function as the equivalent of a reinforcing fiber. The matrix resin, however, does not wet with the metal as well as it does with the reinforcing fibers and the metal does not have the strength commonly available with the fibers. Therefore, a reinforced susceptor promises improved bond strength.

While alignment of the susceptors and the coil segments permits controlled welding along the bondlines, sometimes it is desirable to complete both the rib and spar welds simultaneously. This simultaneous welding can be done by molding the susceptor into the skin faying surface over the entire surface of the part or by changing the orientation of the coil segments with respect to the bondline susceptors. For rib-spar combinations (usually a 90° joint), the coil segments might be oriented 45° to either the rib or the spar. With this orientation, current is generated in both the rib and spar susceptors. The geometry with closeout structure which runs at skew angles is difficult. Here, susceptor design likely will play a role in achieving uniform heating on the skew bonelines simultaneously with that on the rib and spar bondlines.

The need for a susceptor in the bondline poses many obstacles to the preparation of quality parts. The metal which is used because of its high susceptability differs markedly in physical properties from the resin or fiber reinforcement so dealing with it becomes a significant issue. The reinforced susceptor of the present invention overcomes problems with conventional susceptors by including the delicate metal foils 200 (0.10–0.20 in wide×0.005–0.010 in thick; preferably 0.10×0.007 in) in tandem with the warp fibers 205 of the woven reinforcement fabric. The foil 200 is always on the remote side of the fabric because it is between the warp thread 205 and the weave threads 210. This arrangement holds the foils in place longitudinally in the fabric in electrical isolation from each other yet substantially covering the entire width of the weld surface while still having adequate space for the flow and fusion of the thermoplastic resin. Furthermore, in the bondline, the resin can contact, wet, and bond with the reinforcing fiber rather than being presented with the resinphilic metal of the conventional systems. There will be a resin-fiber interface with only short runs of a resin-metal interface. The short runs are the length of the diameter of two weave fibers plus the spatial gap between the weave fibers, which is quite small. Thus, the metal is shielded within the fabric and a better bond results. In this woven arrangement to foil can assume readily the contour of the reinforcement. Finally, the arrangement permits efficient heat transfer from the foil to the resin in the spatial region where the bond will form.

As shown in FIG. 4, the susceptors for the top and bottom are connected together into a loop circuit with jumpers 115 at the ends of the spars 105. The jumpers 115 allow the current which the magnetic field induces to flow around the assembly to generate heat in the bondlines.

With the wingskin/spar combination assembled on the pressure pads in the cavity, we close the dies and energize the coil 35 using a frequency of about 3–10 kHz to produce about 400 kw. This energy produces an oscillating magnetic field around the assembly (which preferably is aligned with the central axis of the coil) that rapidly heats the susceptors to the desired welding temperature. We prefer to use a "smart" susceptor made from a nickel-iron alloy as discussed in U.S. patent application Ser. No. 08/469,604, entitled "Method for Achieving Thermal Uniformity in Induction Processing of Organic Matrix Composites or Metals," which will assure that we do not overheat the bondline as well as assuring a substantially uniform temperature in the bondline during the fusion period when the thermoplastic resin is melted. As shown in FIG. 3, we simultaneously make the six welds (one weld on each spar cap of the 3 spars), which greatly reduces processing time. The welding process is quite fast taking about 25–30 minutes including heating to the melt, holding the temperature during the weld fusion, and cooling. Throughout the process, we maintain a pressure of about 30–100 psi along the bondline. The weight of the assembly may make the pressure slightly higher on the bottom than the top but this pressure difference should be insignificant to the quality of the weld and the performance of the completed part. The assembly is economical from a tooling standpoint because the same tools used to consolidate the wingskins can be reused in completing the welding.

While we refer to wingskin/spar cap welds, the process applies to wingskin/rib cap welds, and, generally, completes both welds simultaneously. We use "spar cap" and "rib cap" interchangeably unless the context forces a different meaning.

The welding process might cause the combination to sag when the bondline reaches the melt temperature where the flow needed for focusing the fusion bond occurs. Therefore, it may be necessary to support the assembly from the inside. Our preferred support concept is described in U.S. patent application Ser. No. 08/469,985 entitled "Internal Tooling for Induction Heating," and involves using heat resistant silicone rubber bladders or other inflatable devices to fill the spaces defined by the assembled skins and spars. Other tooling might also be used, such as filling the space with salt or another material that we can later dissolve, including ceramics. If support tooling is used, the part design must be such that the support tooling can be removed after the welds are formed. In this case, for example, the combination cannot have completely closed cavities. It generally will not because ribs are omitted from the assembled combination, since welding ribs transverse to the magnetic field can be troublesome. If the ribs and the spars are welded simultaneously, then the coil segments will be at a skew angle relative to either the ribs or spars. In this case, obtaining even heating in both depends on the actual geometry of the wingbox that is being fabricated and on the configuration of the susceptor and of the magnetic field. The need to remove the support tooling can severely impact the parts we can fabricate.

The integrity of the weld is critical to the performance of the completed, welded structure. The quality of the weld is related to the temperature along the bondline and good welds require control of the temperature within a relatively narrow range during the welding. We particularly want to avoid overheating, so a "smart" susceptor made from a Co, Ni, or Fe alloy with a Curie temperature slightly above the melting temperature of the resin will help ensure that we produce quality welds. Furthermore, an alloy like Invar 42 (42% Ne–58% Fe) has a coefficient of thermal expansion (CTE) comparable to the resin composite so that embedding the susceptor into the completed part will not have as dramatic an impact if the susceptor is such an alloy rather than copper or another metal where the CTE mismatch between the resin and susceptor is larger.

The present invention is applicable to all types of organic matrix composites including both thermosetting and the thermoplastic composites such as epoxies, bismaleimides, polyimides, PEEK, PEK, PEKK, PES, or the like. It is especially suited, however, for consolidation or forming of resins that have low volatiles content and that are nonreactive (i.e., the true thermoplastics like PEEK or ULTEM).

The surface of an aircraft wing skin must be maintained to a close tolerance to achieve an efficient aerodynamic surface. The tolerances of the inner mold line surface of the wing skin must also be maintained at a close tolerance at least in a buildup area where the wing skin will be joined to a spar to ensure that the wing skin and spar can be precisely joined. It is not critical, however, to control the inner mold line surface in areas where the wing skin is not attached to other structures. The composite panel has additional plies to define the buildup areas. The additional reinforce the composite panel in these areas which is necessary where a spar will be attached, and provide a convenient way to match the skin and spar to produce the desired outer wing configuration even if the spars are imprecise in their dimensions. We can fabricate built up areas at the faying surfaces to provide the precision fit, in which we can eliminate shims.

In thermoplastic welding, the susceptor may be in sheet, mesh, expanded, milled, selvaged or other suitable form and should be structured from the optimum conductivity longitudinally and transversely needed to obtain controlled, reliable, and reproducible heating. Geometry and structure are closely related to the type of induction head used, as those of ordinary skill will understand.

While we have described preferred embodiments, those skilled in the are will readily recognize alterations, variations, and modifications which might be made without departing form the inventive concept. Therefore, interpret the claims liberally with the support of the full range of equivalents known to those of ordinary skill based upon this description. The examples are given to illustrate the invention and not intended to limit it. Accordingly, limit the claims only as necessary in view of the pertinent prior art.

We claim:

1. An induction heating apparatus, comprising:
   (a) a pair of ceramic dies, each die having a die face for seating with the other die in a closed position, the closed die faces defining a cavity having peripheral walls for containing a workpiece, the dies containing a plurality of substantially straight induction coil segments adjacent all the walls of the cavity to surround the cavity along all sides;
   (b) means for connecting the coil segments into a solenoid coil having a centerline;
   (c) a pair of strongbacks for holding the dies and for moving the dies between an open position permitting loading of a workpiece into the cavity and the closed position wherein the workpiece is substantially along the centerline of the coil.

2. The apparatus of claim 1 wherein the coil segments are tubing sections that extend along the length of each respective die in a regular array along the cavity walls to form a substantially uniform magnetic field to provide substantially uniform heating.

3. The apparatus of claim 1 wherein each die includes a peripheral compression frame and both longitudinal and transverse reinforcing rods spanning the dies and bearing against the frame to provide a compressive load to the ceramic dies.

4. The apparatus of claim 1 further comprising a channel within each induction coil segment and connectable to form a fluid circuit for a cooling fluid.

5. The apparatus of claim 1 wherein the dies are cast.

6. An induction heating apparatus, comprising:
   (a) a pair of cast ceramic dies, each die having a die face for seating with the other die in a closed position, the closed die faces defining a cavity having peripheral walls for containing a workpiece, the dies containing a plurality of induction coil segments adjacent all the walls of the cavity to surround the cavity along all sides;
   (b) means for connecting the coil segments in a solenoid coil having a centerline;
   (c) a pair of strongbacks for holding the dies and for moving the dies between an open position permitting loading of a workpiece into the cavity and the closed position wherein the workpiece is substantially along the centerline of the coil; and
   (d) pressure pads on the faces of the cavity for transferring pressure from the strongbacks through the die to the workpiece.

7. A method for thermoplastic welding, comprising the steps of:
   (a) positioning a preform having at least two prefabricated, composite parts in a cavity formed by matched ceramic dies contoured with a curved profile to match generally the outer configuration of the preform along a centerline of a solenoid coil, the coil having induction coil segments embedded in the dies along the curved profile surrounding all sides of the preform, the preform having a susceptor tape including a metal susceptor embedded within a thermoplastic resin positioned along the bondline between the parts; and
   (b) energizing the coil to heat the susceptor inductively to form a thermoplastic fusion bond on the bondline between the parts.

8. The apparatus of claim 1 wherein the cavity walls define a generally elongated hexagonal shape and wherein the coil segments are embedded in the dies a substantially uniform depth from the walls along all six sides of the hexagon.

9. The apparatus of claim 8 wherein the coil segments are spaced substantially uniformly apart.

10. The apparatus of claim 1 wherein the dies are made from a material insusceptible to induction heating, transmissive of the magnetic field created when the coil is energized, and thermally insulating whereby the closed dies trap heat in the workpiece when the workpiece heats inductively.

11. The apparatus of claim 10 further comprising a coil driver for energizing the coil.

12. The apparatus of claim 6 wherein the cavity walls define a generally elongated hexagonal shape; wherein the coil segments are embedded in the dies a substantially uniform depth from the walls along all six sides of the hexagon; wherein the coil segments are spaced substantially uniformly apart; and wherein the dies are made from a material insusceptible to induction heating, transmissive of the magnetic field created when the coil is energized, and thermally insulating whereby the closed dies trap heat in the workpiece when the workpiece heats inductively.

13. The method of claim 7 wherein the composite parts are, respectively, a spar and skin.

14. A method for thermoplastic welding, comprising the steps of:

(a) positioning a preform having at least two prefabricated, composite parts along a centerline of a solenoid coil having induction coil segments surrounding all sides of the preform, the preform having at least two metal susceptors positioned between the parts; and (b) energizing the coil to heat the susceptor inductively to form a thermoplastic fusion bond between the parts;

wherein the parts include at least one spar and two skins, the spar having upper and lower spar caps for bonding to a respective skin;

the interface between a spar cap and a skin defines a bondline;

a susceptor is positioned along each bondline;

the susceptor along the upper spar cap and the susceptor along the lower spar cap are electrically connected together with jumpers; and when the coil is energized, fusion bonds are produced simultaneously along the bondlines between the parts on both the upper spar cap and the lower spar cap.

15. The method of claim 14 wherein the length of the spar is aligned substantially parallel with the centerline of the coil.

\* \* \* \* \*